United States Patent Office 3,216,115
Patented Nov. 9, 1965

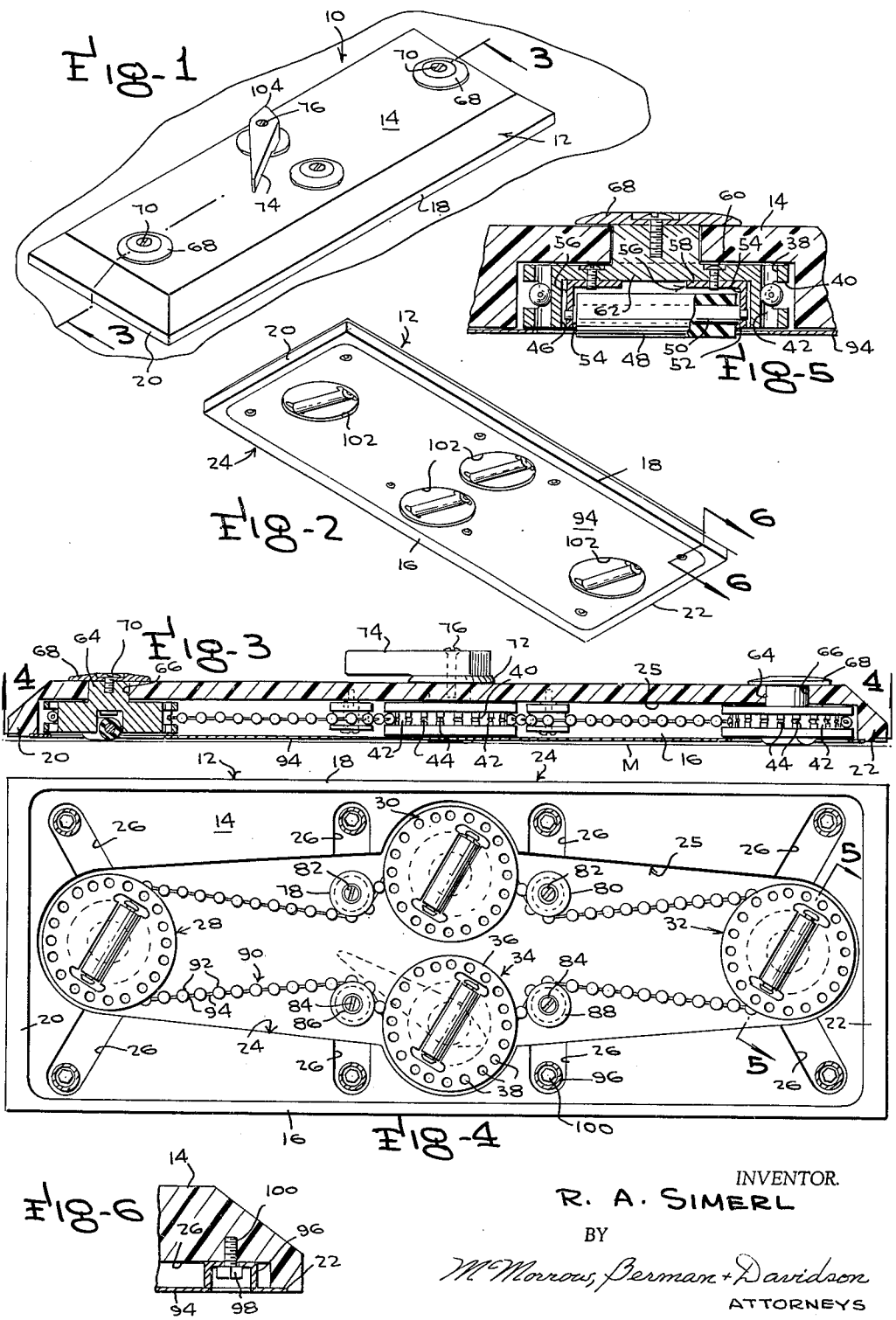

3,216,115
PARALLEL RULE
R. A. Simerl, 813 S. Fairfax St., Alexandria, Va.
Filed Apr. 19, 1963, Ser. No. 274,214
4 Claims. (Cl. 33—109)

This invention relates to the general field of geometric instruments and, more specifically, the instant invention pertains to a rule.

One of the primary obpects of this invention is to provide a geometrical device specifically designed as an aid in calculating navigation courses. To this end, the instant invention is directed to the provision of a compact means for estimating the course of a vessel, the means being substantially rigid and which does not involve the use of expansible and retractable parallel rules of the type commonly employed in plotting the course of a vessel.

A further object of this invention is to provide a parallel rule which is compact and which may be readily employed on maps of any size to determine a navigational course.

A further object of this invention is to provide a parallel rule wherein gross adjustment means are provided which, in turn, gives rise to extremely accurate navigational data.

Still another object of this invention is to provide a geometrical instrument which may be used to plot the courses of vessels, the instrument being readily adapted for use with maps having but a single navigation rosetta.

The present invention has, as a still further object thereof, the provision of a geometric instrument to enable the user thereof to draw an infinite number of lines parallel to one another and parallel to a reference line.

The invention contemplates, as a further object thereof, the provision of a navigational instrument in the nature of a parallel rule, the instrument being non-complex in construction and assembly, relatively inexpensive to manufacture, and which is durable in use.

Other and further objects and advantages of the instant invention will become more manifest from a consideration of the following specification when read in conjunction with the annexed drawing, in which:

FIGURE 1 is a top perspective view of a parallel rule constructed in accordance with the teachings of this invention and illustrating the same as being applied to a map, chart or other analogous type drawing;

FIGURE 2 is a bottom perspective view of the the instrument illustrated in FIGURE 1;

FIGURE 3 is an enlarged detail, medial, longitudinal cross-sectional view, FIGURE 3 being taken substantially on the vertical plane of line 3—3 of FIGURE 1, looking in the direction of the arrows;

FIGURE 4 is a bottom plan view of the instrument, the bottom cover plate having been removed;

FIGURE 5 is an enlarged detail, cross-sectional view, FIGURE 5 being taken substantially on the inclined plane of line 5—5 of FIGURE 4, looking in the direction of the arrows; and FIGURE 6 is an enlarged fragmentary, detail cross-sectional view, FIGURE 6 being taken substantially on the vertical plane of line 6—6 of FIGURE 2, looking in the direction of the arrows.

Reference numeral 10 designates, in general, a navigation instrument constructed in accordance with this invention. Basically, this instrument comprises an elongated substantially-hollow rectangular housing 12 which includes an elongated substantially rectangular top wall 14 from the longitudinally-extending marginal sides of which depend a pair of laterally-spaced and substantially-parallel side walls 16, 18. Also depending from the ends of the top wall 14 in longitudinally-spaced and substantially-parallel relationship are end walls 20, 22. Each adjacent pair of side and end walls are integrally connected to form an endless flange or skirt designated, generally, by the reference numeral 24 (see FIGURE 4).

To serve a function to be described, the exterior surfaces of the side walls 16, 18 are parallel to one another, as are the exterior surfaces of the end walls 20, 22.

As is clearly seen in FIGURES 3 and 4, the top wall 14 is formed with an elongated substantially oval-shaped recess 25 and a plurality of recesses 26 at spaced intervals around the periphery of the flange 24.

Reference numerals 28, 30, 32 and 34 indicate a plurality of chain sprockets of identical construction and, consequently, the description of one will serve as a description of the others. Referring to sprocket 34, it is seen that the same comprises a substantially flat discoidal main body portion 36 through which is bored a plurality of circumferentially-spaced passages 38 (see FIGURE 5) disposed adjacent the marginal outer edge. The peripheral edge of the sprocket 34 is now formed with an endless slot 40 which is in open communication with the passages 38 intermediate their ends, thereby forming substantially semi-circular pockets 42. Each pair of adjacent opposed edges of the pockets 42 are formed with slots 44.

The underside of each of the sprockets 28, 30, 32 and 34 is formed with a diametrically-extending substantially rectangular recess 46 in which is disposed an elongated cylindrical roller 48 preferably formed of rubber or of a suitable plastic having a substantially non-skid physical characteristic. The roller 28 has an axially-extending shaft 50 which has opposed protruding ends 52 of reduced diameter and which are journaled for rotation in the feet 54 of a pair of L-shaped brackets 56. The legs 58 of the brackets 56 are secured by screws 60 to the bight wall 62 of recess 46.

The sprockets 28, 30, 32 and 34 are all formed with coaxial integrally-constructed upright cylindrical bosses 64 that are journaled for rotation in openings 66 that extend transversely through the top wall 14. A pair of openings 66 are located adjacent each end of the top wall 14 on its longitudinal axis, and a second pair of openings 66 are disposed centrally of the top wall 14 on its transverse axis.

Washers 68 are superposed over the upper ends of the bosses 64 of the sprockets 28, 30 and 32 through which extend screws 70 that are threaded into the bosses of the last-named sprockets. Mounted over the upper end of the boss 64 for the sprocket 34 is a washer 72, and superimposed thereon is a pointer handle 74. A screw 76 extends through the handle 74, the washer 72, and is threaded into the boss 64 of the sprocket 34.

A pair of idler rollers 78, 80 are secured on screws 82 on opposite sides of the sprocket 30, the screws being threaded into the top wall 14, and a similar pair of screws 84 secure the idler rollers 86, 88 to the top wall 14, these last-mentioned rollers being located on opposite sides of the sprocket 34.

A conventional flexible ball link chain is denoted at 90 and comprises alternating balls 92 and wire links 94. The chain 90 is trained around the sprockets 28, 30, 32 and 34, as well as the idler rollers 78, 80, 86 and 88 in the manner shown. As is seen in FIGURES 3, 4 and 5, those portions of the chain 90 which train about the sprockets 28, 30, 32 and 34 have their respective balls 92 engaged within certain of the sprockets 38 while the adjacents links 94 lie in the slots 44.

An elongated, substantially rectangular base plate 94 extends across the bottom ends of the side and end walls 16, 18 and 20, 22, respectively, the base plate serving as a closure member for the underside of the housing 12.

The base plate 94 is formed with a plurality of inwardly-extending, substantially hollow cylindrical sleeves 96 across the inner ends of which extend centrally-apertured end walls 98. The sleeves 96 are adapted to be aligned over the recesses 26 and the base plate 94 is releasably secured to the underside of the housing 12 by screws 100 which pass through the apertured end walls 98 for threaded engagement in the top wall 14 (see FIGURE 6). The base plate 94 is formed with a transversely-extending cylindrical opening 102 for each of the sprockets 28, 30, 32 and 34, the openings 102 having a diameter slightly greater than the distance between the remotely-disposed sides of the foot portions 54 of the brackets 56. The rollers 48 are seen to depend from the top wall 14 on brackets 56 a distance so as to project slightly below the base plate 94. In assembling the above-described component elements of this invention, the longitudinal axes of the shafts 50 are arranged parallel to one another, and the longitudinal axis of the handle 74 is disposed at substantially right angles to the axis of the shaft 50 of the sprocket 34. As will be seen below, the handle 74 has a short indicator end 104 falling on the axis of the handle.

Having described and illustrated the component elements of this invention in detail, the operation thereof will be briefly described.

Let it be assumed that M represents a map and that it is desired to calculate the course of a vessel, such as a ship. Under these circumstances, the navigator will normally take two fixes at spaced intervals and a straight connecting line is then drawn therethrough. The fixes are, of course, plotted on the map.

The rule constructed in accordance with the teachings of this invention is now placed on the map M with the rollers 48 engaging thereagainst. The rule is adjusted so that one of the side walls 16, 18 extends parallel to the aforementioned line after which the operator will turn the handle 74 in the direction of the adjacent compass rosetta so that the indicator end 104 thereof is grossly adjusted. As the handle 74 is turned, the rollers 48 will also turn in the direction of the rosetta. The rule 10 is now rolled across the map M until one of the two side walls 16, 18 extends diametrically across the navigation rosetta and the course is then determined.

It will be instantly recognized that the rule 10 may be used in other fields, for example, in drafting wherein it is necessary to draw a number of lines parallel to one another.

Having described and illustrated one embodiment of this invention in detail, it will be understood that the same has been offered merely by way of example, and that this invention is to be limited only by the scope of the appended claims.

What is claimed is:

1. A rule comprising an elongated substantially hollow rectangular housing having a normally horizontal substantially rectangular top wall, said top wall having a pair of opposed parallel depending side walls and a pair of opposed depending parallel end walls, a sprocket rotatably supported on said top wall adjacent each of its respective ends and depending therefrom, an elongated roller for each of said sprockets, said rollers having substantially parallel axes, bracket means supporting said rollers from said sprockets for extension of portions of said rollers below the lower edges of said side and end walls, a third sprocket rotatably supported on said top wall and depending therefrom intermediate its said ends, a continuous chain trained about said sprockets, and handle means connected with one of said sprockets operable to effect an adjustment of said axes of said rollers relative to said side and end walls.

2. A rule as defined in claim 1, wherein said handle means is connected with said third sprocket.

3. A rule as defined in claim 2, and cover means extending across the lower end of said housing and secured to said top wall, said cover means having openings formed therein to receive said rollers therethrough.

4. A rule as defined in claim 3, wherein said third sprocket is provided with an elongated roller depending therefrom, said third roller having its axis parallel to the axes of said first main rollers, said cover means having an opening formed therein to receive said third roller therethrough for projection below the lower edges of said side and end walls, a fourth sprocket disposed intermediate said ends of said housing, an elongated fourth roller supported on said fourth sprocket and depending therefrom, an opening formed in said cover member to receive said fourth roller therethrough for projection below the lower edges of said side and end walls, said chain being trained about said fourth sprocket, and idler rollers mounted on said top wall and depending therefrom in the path of movement of said chain.

References Cited by the Examiner

UNITED STATES PATENTS

| 481,432 | 8/92 | Soler | 33—141.5 |
| 723,039 | 3/03 | Schmitt | 33—109 |
| 1,111,174 | 9/14 | Ostringer | 33—109 |
| 2,506,243 | 5/50 | Sill | 33—109 |

FOREIGN PATENTS

| 336,843 | 5/21 | Germany. |
| 381,836 | 9/23 | Germany. |

ISAAC LISANN, *Primary Examiner.*